(12) United States Patent
Yokokawa

(10) Patent No.: US 8,436,795 B2
(45) Date of Patent: May 7, 2013

(54) ELECTRO-OPTICAL DEVICE AND ELECTRONIC APPARATUS

(75) Inventor: Magoyuki Yokokawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1482 days.

(21) Appl. No.: 11/894,008

(22) Filed: Aug. 17, 2007

(65) Prior Publication Data

US 2008/0088569 A1    Apr. 17, 2008

(30) Foreign Application Priority Data

Oct. 13, 2006 (JP) ................. 2006-279509

(51) Int. Cl.
G09G 3/36 (2006.01)
G02F 1/1333 (2006.01)
G02F 1/1345 (2006.01)

(52) U.S. Cl.
USPC ............. 345/87; 349/110; 349/149; 349/151; 349/56

(58) Field of Classification Search ............ 345/87–104; 349/56, 58, 60, 190
See application file for complete search history.

(56) References Cited

U.S. PATENT DOCUMENTS

| | | | |
|---|---|---|---|
| 5,430,462 A * | 7/1995 | Katagiri et al. ............... | 345/104 |
| 6,330,044 B1 | 12/2001 | Murade | |
| 6,704,068 B2 | 3/2004 | Murade | |
| 6,717,633 B2 | 4/2004 | Murade | |
| 7,023,518 B1 * | 4/2006 | Koyama et al. ............... | 349/151 |
| 2002/0063518 A1 * | 5/2002 | Okamoto et al. ............. | 313/506 |
| 2003/0011552 A1 * | 1/2003 | Ishii et al. ....................... | 345/89 |
| 2003/0107698 A1 * | 6/2003 | Nagayama et al. ........... | 349/149 |
| 2005/0230719 A1 * | 10/2005 | Aoki et al. ..................... | 257/291 |

FOREIGN PATENT DOCUMENTS

| | | |
|---|---|---|
| JP | 2002-221738 | 8/2002 |
| JP | 2003-241206 A | 8/2003 |
| JP | 2003-273361 | 9/2003 |
| JP | 2006-072060 | 3/2006 |

\* cited by examiner

*Primary Examiner* — Sumati Lefkowitz
*Assistant Examiner* — David Tung
(74) *Attorney, Agent, or Firm* — ALG Intellectual Property, LLC

(57) ABSTRACT

An electro-optical device includes a scanning-line driving circuit disposed in a peripheral region around the pixel area, and supplies, through scanning lines, a plurality of scanning signals to a plurality of pixel portions in the pixel area. The data-line driving circuit is disposed in the peripheral region, and supplies a plurality of sampling signals to a sampling circuit, which samples image signals and supplies the sampled image signals to data lines. A light-shielding film covers only the scanning-line driving circuit and the data-line driving circuit of a peripheral circuit portion disposed in the peripheral region.

5 Claims, 5 Drawing Sheets

ELECTRO-OPTICAL DEVICE AND ELECTRONIC APPARATUS

BACKGROUND

1. Technical Field

The present invention relates to an electro-optical device, such as a liquid crystal device, and an electronic apparatus, such as a liquid crystal projector, including the electro-optical device.

2. Related Art

In a liquid crystal device, a display area on which images are displayed by driving a liquid crystal layer is formed by sealing the liquid crystal layer between a pair of substrates disposed so as to face each other. A method for injecting liquid crystal into the liquid crystal device includes, for example, fixing the pair of substrates to each other with a sealing material and injecting liquid crystal from a liquid crystal inlet that is formed by partially not applying the sealing material into between the pair of substrates. A sealing portion is cured by ultraviolet (UV) irradiation on, for example, backside of one substrate.

According to JP-A-2003-241206, a method for manufacturing a liquid crystal display apparatus is disclosed, and the method can be used to manufacture liquid crystal display apparatuses in which, for example, pixel-switching thin-film transistors (TFTs), each of which is formed at a pixel, can be shielded from light.

In this type of electro-optical device, various circuits, such as a scanning-line driving circuit and a data-line driving circuit, for driving pixel portions formed in a pixel area are disposed in a peripheral region around the pixel area. Therefore, when two substrates sandwiching liquid crystal are fixed to each other with a UV-curable resin or the like, there is a disadvantage that semiconductor elements, such as TFTs, included in various circuits may be damaged by irradiation with UV light used to cure, for example, the UV-curable resin.

Although it is possible to form a light-shielding film covering the entirety of a peripheral circuit portion to shield the peripheral circuit portion from UV light, a stress acting on the light-shielding film may cause a crack in the light-shielding film which would result in insufficient light-shielding for the peripheral circuit portion.

SUMMARY

An advantage of some aspects of the invention is to provide, for example, an electro-optical device that can reduce damage of semiconductor elements caused by irradiating the semiconductor elements with UV light and an electronic apparatus including the same.

According to a first aspect of the invention, there is provided an electro-optical device including a plurality of scanning lines and a plurality of data lines, a scanning-line driving circuit, a data-line driving circuit, and a light-shielding film. The scanning lines and the data lines cross each other in a pixel area on a substrate. The scanning-line driving circuit is disposed in a peripheral region around the pixel area on the substrate, and supplies a plurality of scanning signals to a plurality of pixel portions formed in the pixel area through the scanning lines. The data-line driving circuit is disposed in the peripheral region, and supplies a plurality of sampling signals to a sampling circuit that samples a plurality of image signals and supplies the sampled image signals to the data lines. The light-shielding film is formed so as to completely overlap the scanning-line driving circuit and the data-line driving circuit of a peripheral circuit portion disposed in the peripheral region, and avoid other circuits in the peripheral circuit portion.

In the electro-optical device according to the first aspect of the invention, the data-line driving circuit supplies the sampling signals to the sampling circuit through the data lines. For example, the waveforms of a plurality of transfer signals are changed in the data-line driving circuit, and the changed transfer signals are input to a plurality of sampling switches disposed on the data lines in the sampling circuit as the sampling signals. The sampling switches sample the image signals in response to the sampling signals, and the sampled image signals are input to the corresponding data lines. For example, the image signals are supplied to the pixel portions, which are formed in the pixel area, through a plurality of pixel-switching elements for performing switching operations in response to the scanning signals supplied from the scanning-line driving circuit through the scanning lines. The "circuits" indicate transistors operating singly or together as functional elements. The "pixel area" indicates an area on the substrate in which the pixel portions are disposed in plan view, i.e., an area for displaying images by driving the pixel portions. For example, an "image display area" according to the first aspect of the invention may be an example or a typical example of the "pixel area".

The light-shielding film is formed so as to cover only the scanning-line driving circuit and the data-line driving circuit of the peripheral circuit portion disposed in the peripheral area. More specifically, the light-shielding film is formed so as to shield the scanning-line driving circuit and the data-line driving circuit from UV light, when, for example, a UV-curable resin for fixing a TFT array substrate and a counter substrate to each other is irradiated with the UV light. That is, the light-shielding film is formed on the side where a unit that irradiates the UC curable resin with UV light is disposed when viewed from, for example, the scanning-line driving circuit. In other words, the light-shielding film is formed lower than the surface or the layer of the substrate on which, for example, the data-line driving circuit is formed. Thus, the light-shielding film can shield semiconductor elements, which are included in the data-line driving circuit and the scanning-line driving circuit, from the UV light, so that the UV irradiation damage to the semiconductor elements can be reduced.

Additionally, since the light-shielding film covers only the scanning-line driving circuit and the data-line driving circuit of the peripheral circuit portion disposed in the peripheral region, the light-shielding film can become resistant to cracking compared with when a continuous light-shielding film is formed in the peripheral region. Thus, for example, when a sealing material for fixing the TFT array substrate and the counter substrate to each other, is irradiated with the UV light in order to cure the sealing material, the light-shielding film can assuredly shield the data-line driving circuit and the scanning-line driving circuit from the UV light in order to prevent the data-line driving circuit and the scanning-line driving circuit from being irradiated with the UV light.

It is preferable that the pixel portions have a plurality of pixel electrodes electrically connected to the data lines and a counter electrode facing the pixel electrodes. In this case, the light-shielding film may be electrically connected to the counter electrode and may be formed so as to cover a common electric potential line for supplying a common electric potential to the counter electrode.

By using the above-mentioned light-shielding film, for example, electric potential fluctuation of the common electric potential line, i.e., electric potential fluctuation caused by irradiating the common electric potential line with UV light, can be reduced. When at least one portion of the common electric potential line is covered with the light-shielding film, the electric potential fluctuation, which is caused by irradiating the common electric potential line with UV light, can be reduced in accordance with the overlap between the light-shielding film and the common electric potential line.

It is preferable that the substrate include a plurality of layers, and the light-shielding film be formed on the same layer as at least one of the layers.

The above-mentioned light-shielding film can be formed using a common process in which wiring or a film serving as, for example, an electroconductive film, is formed on the substrate. This allows the manufacturing process of liquid crystal devices to be simplified compared with when the light-shielding film is formed separately.

It is preferable that the light-shielding film be a tungsten silicide film.

Accordingly, the tungsten silicide film can block light more effectively than other silicide films.

An electronic apparatus according to a second aspect of the invention includes the above-described electro-optical device according to the first aspect of the invention.

Since the electronic apparatus according to the second aspect of the invention includes the above-described electro-optical device according to the first aspect of the invention, various high-quality display electronic apparatuses can be realized such as projection display devices, cellular telephones, electronic notepads, word processors, viewfinder-type or monitor-direct-view-type videotape recorders, workstations, videophones, point-of-sale (POS) terminals, and touch panels. In addition, an electrophoresis apparatus or the like such as electronic paper can be realized as the electronic apparatus according to the second aspect of the invention.

Further operations and advantages according to the aspects of the invention will become apparent from the following description of exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

An electro-optical device and an electronic apparatus according to exemplary embodiments of the invention will be described hereinafter with reference to the drawings.

1: Electro-Optical Device

Figure 1:
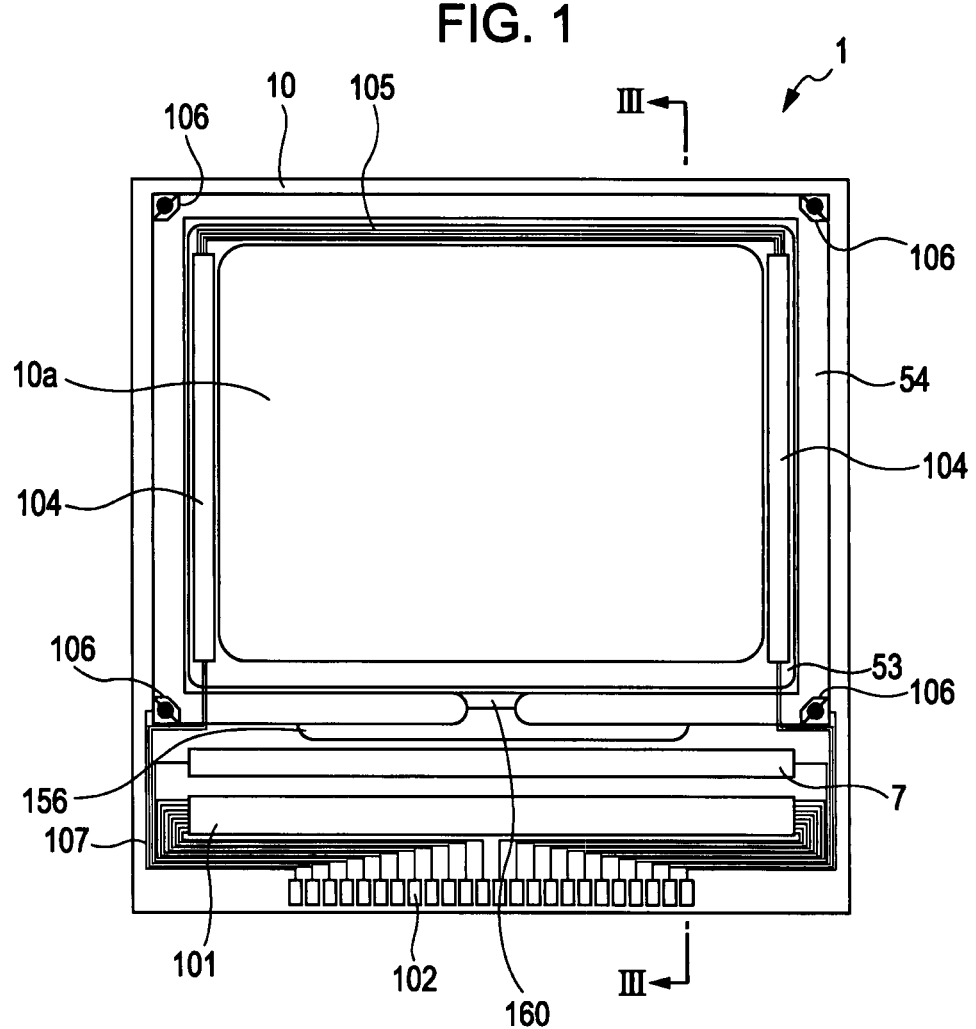
FIG. 1 is a plan view of a liquid crystal device according to an embodiment, the plan view being viewed from a counter substrate.
Figure 2:
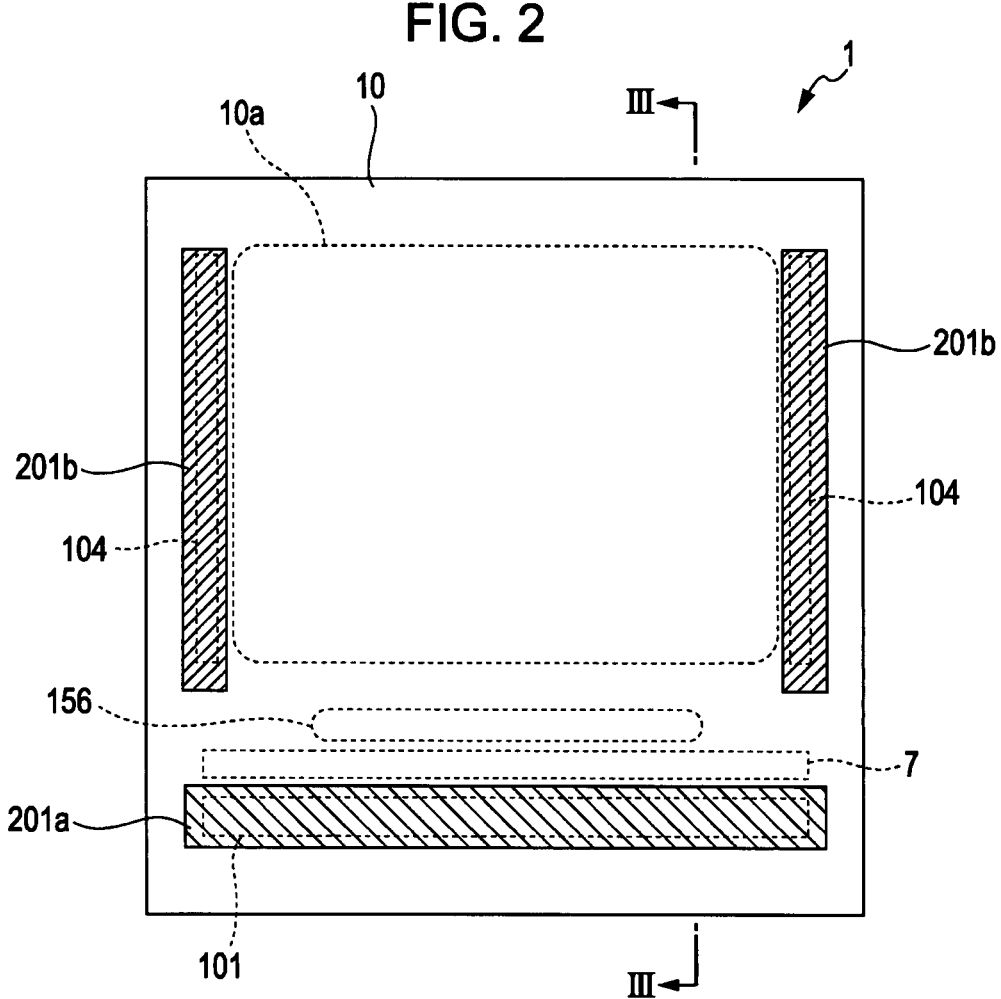
FIG. 2 is a plan view illustrating essential portions of the liquid crystal device according to the embodiment.
Figure 3:
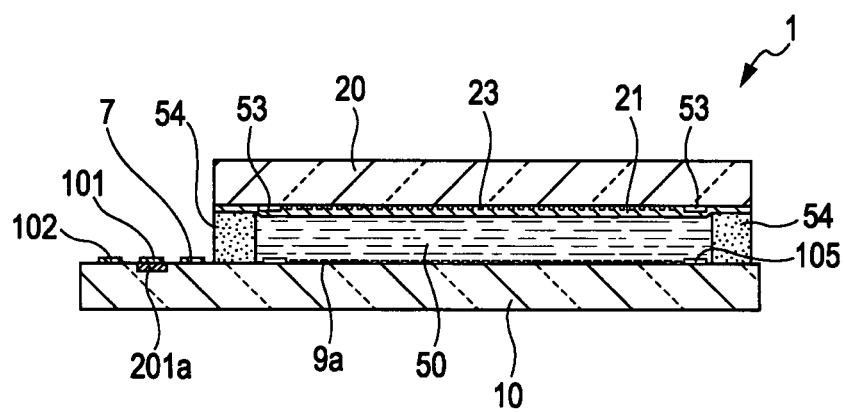
FIG. 3 is a sectional view taken along the line III-III of each of FIGS. 1 and 2.

A specific configuration of an electro-optical device according to an embodiment of the invention will now be described below with reference to FIGS. 1 to 3. In the embodiment, an example of the electro-optical device is discussed below in the context of a liquid crystal device 1 that employs a TFT active matrix display type. FIG. 1 is a plan view illustrating the liquid crystal device 1 when viewed from a counter substrate. FIG. 2 is a plan view illustrating essential portions of the liquid crystal device 1. FIG. 3 is a sectional view taken along the line III-III of each of FIGS. 1 and 2.

Referring to FIGS. 1 and 3, the liquid crystal device 1 includes a TFT array substrate 10 and a counter substrate 20 that are disposed facing each other. A liquid crystal layer 50 is sealed between the TFT array substrate 10 and the counter substrate 20. The TFT array substrate 10 and the counter substrate 20 are fixed to each other with a sealing material 54 disposed in a sealing area that is positioned around an image display area 10a which is a specific example of a "pixel area" according to the invention. The sealing material 54 is composed of a UV-curable resin for fixing the TFT array substrate 10 and the counter substrate 20 to each other, and is cured by UV irradiation after being applied to the TFT array substrate 10 during the manufacturing process. The sealing material 54 includes a gap material, such as glass fibers or glass beads, for providing a predetermined space (gap) between the TFT array substrate 10 and the counter substrate 20. A portion which is sandwiched between the TFT array substrate 10 and the counter substrate 20 and which is not filled with the sealing material 54 is a liquid crystal inlet 160 for injecting liquid crystal between the TFT array substrate 10 and the counter substrate 20 after the TFT array substrate 10 and the counter substrate 20 are fixed to each other. The liquid crystal inlet 160 is sealed with a sealing portion 156 after the injection of the liquid crystal. The sealing portion 156 is formed of, for example, a UV-curable resin, and is cured by UV irradiation from the side of the TFT array substrate 10 or from the side of the counter substrate 20 after the liquid crystal inlet 160 is closed with the UV-curable resin that has not been cured. A frame-like light-shielding film 53 that defines a frame region of the image display area 10a is on the surface of the counter substrate 20 such that the frame-like light-shielding film 53 is positioned in parallel with and farther inward than the sealing area in which the sealing material 54 is disposed. A portion or the entire portion of the frame-like light-shielding film 53 may be included in the TFT array substrate 10 as an internal light-shielding film.

A data-line driving circuit 101, two scanning-line driving circuits 104, a sampling circuit 7, and external-circuit connecting terminals 102, which constitute an example of a "peripheral circuit portion" according to the invention, are disposed in a peripheral region that is positioned around the image display area 10a on the TFT array substrate 10. The data-line driving circuit 101, the sampling circuit 7, and the external-circuit connecting terminals 102 are disposed along one side of the TFT array substrate 10. Each of the two scanning-line driving circuits 104 is disposed along one of two sides adjacent to the above-described side of the TFT array substrate 10 such that the scanning-line driving circuit 104 is covered with the frame-like light-shielding film 53. Additionally, in order to connect the two scanning-line driving circuits 104, each being disposed along either side of the image display area 10a, a plurality of wiring patterns 105 are disposed along the remaining side of the TFT array substrate 10 such that the wiring patterns 105 are covered with the frame-like light-shielding film 53.

Upper and lower conducting terminals 106 for electrically connecting the TFT array substrate 10 and the counter substrate 20 are disposed between the TFT array substrate 10 and the counter substrate 20. The liquid crystal device 1 includes a common electric potential line 107 for electrically connecting the external-circuit connecting terminals 102 to the upper and lower conducting terminals 106. The common electric potential line 107 supplies a common electric potential LCC to a counter electrode 21 disposed on the counter substrate 20 through the upper and lower conducting terminals 106. In operation of the liquid crystal device 1, the liquid crystal is driven in response to electric potential differences between the common electric potential LCC of the counter electrode 21 and pixel potentials of a plurality of pixel electrodes 9a. The common electric potential line 107 is routed, for example, along each side of the TFT array substrate 10, so as to be electrically connected to each of the upper and lower conducting terminals 106. At least one of light-shielding films 201a and 201b described below may cover the common electric potential line 107. The common electric potential line 107 is irradiated with UV light used to cure the sealing material 54 or the sealing portion 156, resulting in fluctuation of the common electric potential LCC. This fluctuation can be reduced by the light-shielding films 201a and 201b, and the display performance of the liquid crystal device 1 can be improved.

Referring to FIGS. 2 and 3, the liquid crystal device 1 includes the light-shielding films 201a and 201b, which have an island shape, covering only the scanning-line driving circuits 104 and the data-line driving circuit 101 of the peripheral circuit portion disposed in the peripheral region of the image display area 10a. The light-shielding films 201a and 201b are formed on the same layer as at least one of a plurality of layers included in the TFT array substrate 10. Accordingly, when the sealing material 54 or the sealing portion 156 is irradiated with the UV light from the side of the TFT array substrate 10 in the manufacture of the liquid crystal device 1, the light-shielding films 201a and 201b can shield semiconductor elements, such as TFTs, which are included in the data-line driving circuit 101 and the scanning-line driving circuits 104, from the UV light. Thus, the UV irradiation damage to the semiconductor elements can be reduced. In addition, since the light-shielding films 201a and 201b cover only the scanning-line driving circuits 104 and the data-line driving circuit 101 of the peripheral circuit portion disposed in the peripheral region, the light-shielding films 201a and 201b can become resistant to cracking compared with when a continuous light-shielding film is formed in the peripheral region around the image display area 10a. Thus, when the sealing material 54 or the sealing portion 156 is cured by UV irradiation, the light-shielding films 201a and 201b can assuredly shield the data-line driving circuit 101 and the scanning-line driving circuits 104 from the UV light in order to prevent the data-line driving circuit 101 and the scanning-line driving circuits 104 from being irradiated with the UV light.

Moreover, the light-shielding films 201a and 201b can be formed using a common process in which wiring or a film serving as, for example, an electroconductive film, is formed on the TFT array substrate 10. This allows the manufacturing process of the liquid crystal device 1 to be simplified compared with when the light-shielding films are formed separately. Examples of the light-shielding films 201a and 201b include tungsten silicide films. The light-shielding property of the light-shielding films 201a and 201b can be improved more by using tungsten silicide films than by using other silicide films.

Referring to FIG. 3, on the TFT array substrate 10, the pixel electrodes 9a are formed on, for example, pixel-switching TFTs and various types of wiring patterns, and an alignment film is formed over the pixel electrodes 9a. In contrast, the counter electrode 21 facing the pixel electrodes 9a with a liquid crystal layer 50 provided therebetween is formed in the image display area 10a on the counter substrate 20. That is, liquid crystal capacitances can be formed between the pixel electrodes 9a and the counter electrode 21 by applying voltages therebetween. A light-shielding film 23 is formed in a grid or stripe pattern on the counter electrode 21, and another alignment film covers the light-shielding film 23. The liquid crystal layer 50 includes, for example, one type of nematic liquid crystal or a mixture of a plurality of types of nematic liquid crystal, and forms a predetermined alignment state between a pair of the alignment films.

For example, an inspection circuit (not shown) for checking the quality or defects of liquid crystal devices while being manufactured or when being shipped may be formed on the TFT array substrate 10. Polarizing films, phase-difference films, or polarizing plates are disposed with predetermined orientations on the light-incident side of the counter substrate 20 and on the light-emitting side of the TFT array substrate 10, in accordance with, for example, normally white mode/normally black mode, or an operational mode such as twisted-nematic (TN) mode, super TN (STN) mode, or double-STN (D-STN) mode. The specific configuration of the liquid crystal device has been described above.

Figure 4:
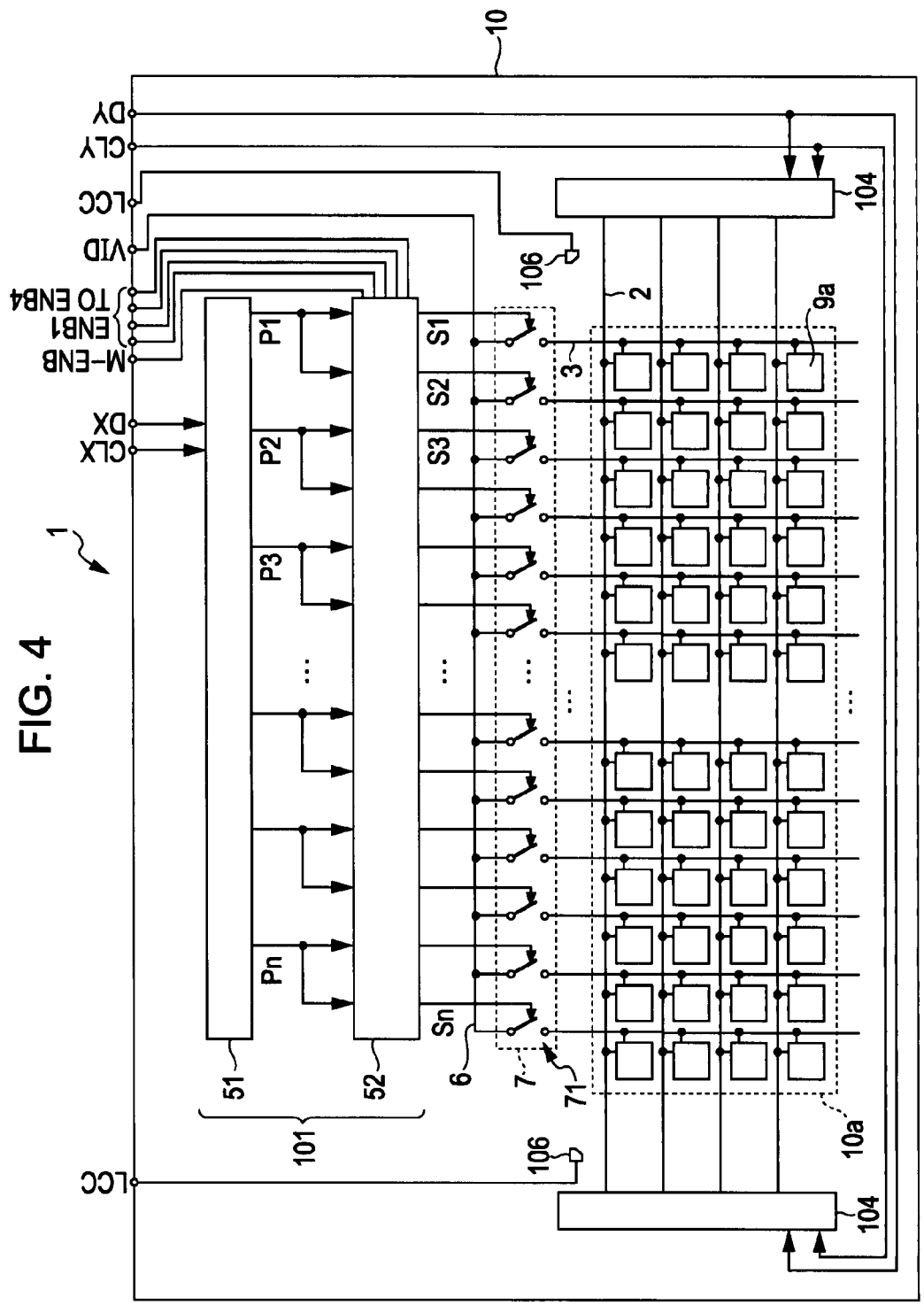
FIG. 4 is a block diagram illustrating a circuit configuration of essential portions of the liquid crystal device according to the embodiment.
Figure 5:
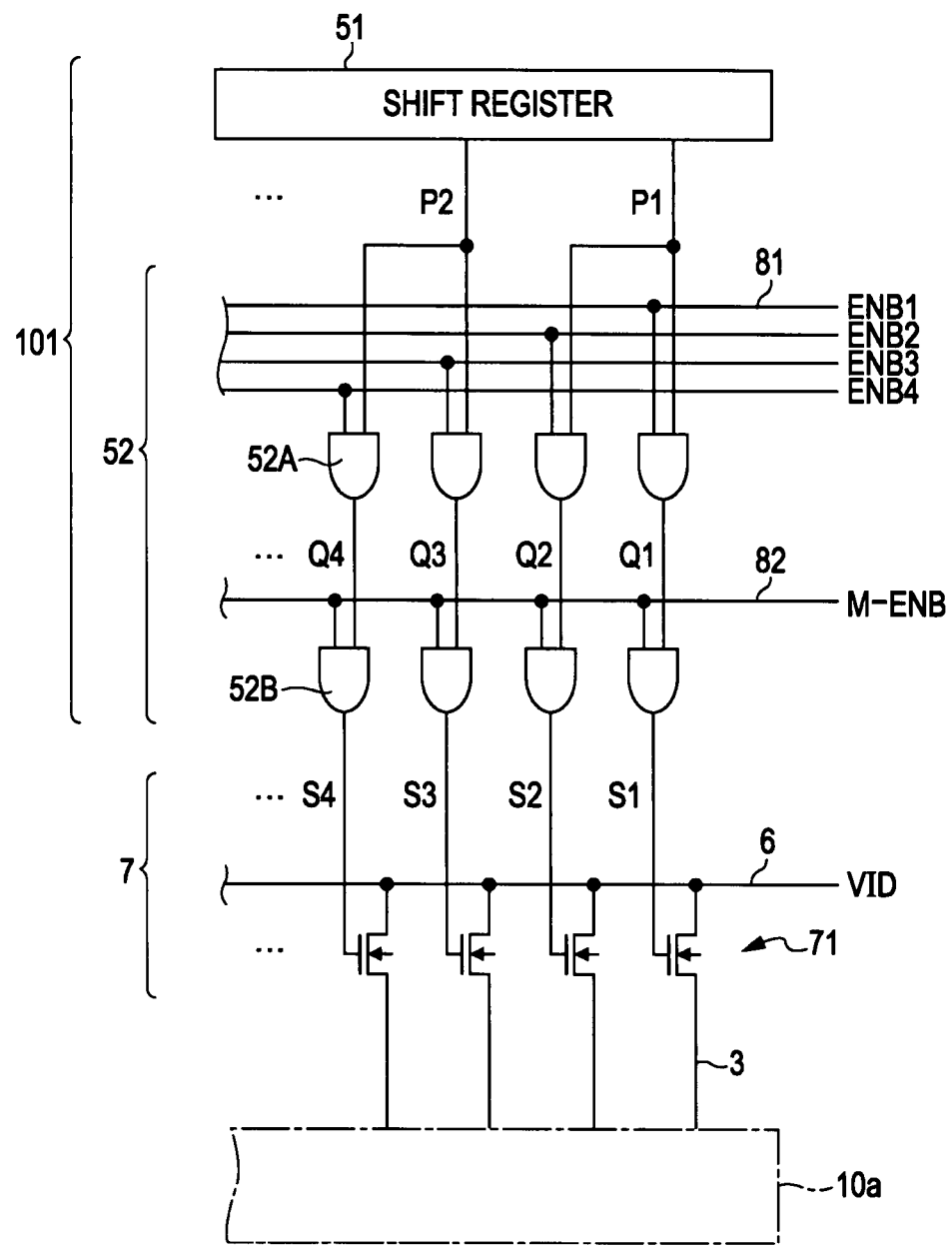
FIG. 5 is a circuit diagram illustrating details of a circuit system, which changes the waveforms of transfer signals, in the block diagram illustrated in FIG. 4.

A circuit configuration of the liquid crystal device 1 will now be described with reference to FIGS. 4 and 5. FIG. 4 shows a circuit configuration of essential portions of the liquid crystal device 1. FIG. 5 shows a circuit portion illustrating a circuit system, which changes the waveforms of transfer signals, in the configuration shown in FIG. 4.

In the liquid crystal device 1 shown in FIG. 4, the TFT array substrate 10 and the counter substrate 20 (not shown) are disposed facing each other with the liquid crystal layer 50 provided therebetween. The TFT array substrate 10 and the counter substrate 20 may be, for example, quartz substrates, glass substrates, or silicon substrates. The liquid crystal device 1 is configured to control a voltage applied to each of the pixel electrodes 9a disposed in a matrix in the image display area 10a and to modulate an electric field applied to the liquid crystal layer 50 for every pixel. This allows transmitted light quantity between the TFT array substrate 10 and the counter substrate 20 to be controllable and images to be displayable in shades. The liquid crystal device 1 employs a TFT active matrix driving system. In the image display area 10a of the TFT array substrate 10, the pixel electrodes 9a disposed in a matrix and a plurality of scanning lines 2 and data lines 3 disposed so as to cross over each other are formed to configure pixel portions corresponding to pixels. Here, although not shown, switching elements, such as transistors or TFTs, and storage capacitors are each formed between a corresponding one of the pixel electrodes 9a and a corresponding one of the data lines 3. Each switching element is controlled to be conductive/non-conductive on the basis of a scanning signal provided through a corresponding scanning line 2, and the storage capacitor is used to hold a voltage applied to a corresponding pixel electrode 9a. Driving circuits including the data-line driving circuit 101 and the like are formed in the peripheral region of the image display area 10a.

The data-line driving circuit 101 includes a shift register 51 and a logic circuit 52. The shift register 51 sequentially outputs transfer signals Pi (i=1, ..., n) from a plurality of stages on the basis of an X clock signal CLX with a predetermined cycle (and an inverted X clock signal CLX') and a shift register start signal DX which are input to the data-line driving circuit 101.

The logic circuit 52 has a function of changing the waveforms of the transfer signals Pi (i=1, ..., n) on the basis of enable signals and outputting sampling signals Si (i=1, ..., 2n) based on the waveform-changed transfer signals Pi.

As shown in FIG. 5, the logic circuit 52 includes AND circuits 52A and 52B. Each of the AND circuits 52A outputs the AND of a corresponding one of the transfer signals Pi (i=1, ..., n) input from the shift register 51 and a corresponding one of enable signals ENB1 to ENB4 provided from four enable signal lines 81 as a first waveform-changed signal Qi (i=1, ..., 2n). Each of the AND circuits 52B is provided after a corresponding one of the AND circuits 52A and outputs the AND of a corresponding one of the first waveform-changed signals Qi (i=1, ..., 2n) and a master enable signal M-ENB provided from an enable signal line 82 as a sampling signal Si (i=1, ..., 2n). The AND operation trims the waveforms of the transfer signals Pi (i=1, ..., n) and the first waveform-changed signals Qi (i=1, ..., 2n) on the basis of the waveforms of the enable signals ENB1 to ENB4 and the master enable signal M-ENB with shorter pulse widths, so that the pulse widths of the transfer signals Pi (i=1, ..., n) and the first waveform-changed signals Qi (i=1, ..., 2n) are limited to the pulse widths of the enable signals.

The AND circuits 52A are configured in pairs, and each pair receives a corresponding one of the transfer signals Pi (i=1, ..., n) input from the shift register 51. That is, the number of wiring patterns around the AND circuits 52A is reduced by half; therefore, the data-line driving circuit 101 with such a configuration can be designed in a limited space and a decreased line pitch can be achieved. Since one of the transfer signals Pi (i=1, ..., n) is simultaneously input to a corresponding pair of the AND circuits 52A, the AND circuits 52A in the corresponding pair each receive a different one of the enable signals ENB1 to ENB4 in order to output the corresponding first waveform-changed signal Qi (i=1, ..., 2n) at timings different from each other.

The sampling circuit 7 samples an image signal VID supplied to an image signal line 6 on the basis of the sampling signals Si (i=1, ..., 2n) serving as reference clock signals, and supplies sampled image signals as data signals to the corresponding data lines 3. The sampling circuit 7 includes sampling switches 71 having, for example, P-channel or N-channel TFTs or complementary TFTs.

Here, for simplicity, one image signal line 6 is provided, and the image signal VID is supplied to any of the sampling switches 71 from the image signal line 6; however, the image signal VID may be subjected to serial-to-parallel conversion (that is, phase expansion). For example, when an image signal is subjected to serial-to-parallel conversion to obtain six parallel image signals VID1 to VID6, the six parallel image signals VID1 to VID6 are input to the sampling circuit 7 through six image signal lines, respectively. The simultaneous supply of a plurality of parallel image signals converted from a serial image signal to a plurality of image signal lines enables input of the image signals in groups to the data lines 3 and lowering of drive frequencies.

Referring back to FIG. 4, the scanning-line driving circuits 104 are configured such that scanning signals are sequentially supplied to a corresponding one of the scanning lines 2 in order to scan the pixel electrodes 9a, which are disposed in a matrix, using data signals and the scanning signals in the direction in which the scanning lines 2 are disposed. Here, the scanning signals are generated on the basis of a Y clock signal CLY serving as a reference clock signal for supplying the scanning signals (and an inverted Y clock signal CLY') and a shift register start signal DY. In that case, a voltage is simultaneously applied to both ends of a target scanning line 2.

Various timing signals including a clock signal are generated by a timing generator, which is not shown, and supplied to the circuits on the TFT array substrate 10. A power supply voltage and the like required for driving each driving circuit are also supplied from external circuits. The common electric potential LCC serving as a counter electrode potential is supplied from an external circuit to signal lines extending from the upper and lower conducting terminals 106. As already mentioned, the common electric potential LCC is supplied to the counter electrode 21 through the upper and lower conducting terminals 106. The common electric potential LCC is a reference potential for the counter electrode 21 in order to form liquid crystal capacitances by properly holding potential differences against potentials of the pixel electrodes 9a.

As described above with reference to FIGS. 4 and 5, the data-line driving circuit 101 and the scanning-line driving circuits 104 include a plurality of semiconductor elements including TFTs for processing various signals. Therefore, as described above with reference to FIGS. 1 to 3, the light-shielding films 201a and 201b according to the embodiment of the invention can block UV light used for curing the sealing material 54 or the sealing portion 156 and can reduce UV light deterioration of the semiconductor elements included in the data-line driving circuit 101 and the scanning-line driving circuits 104. This reduces deterioration of the display performance of the liquid crystal device 1 during manufacturing thereof.

2: Electronic Apparatus

Figure 6:
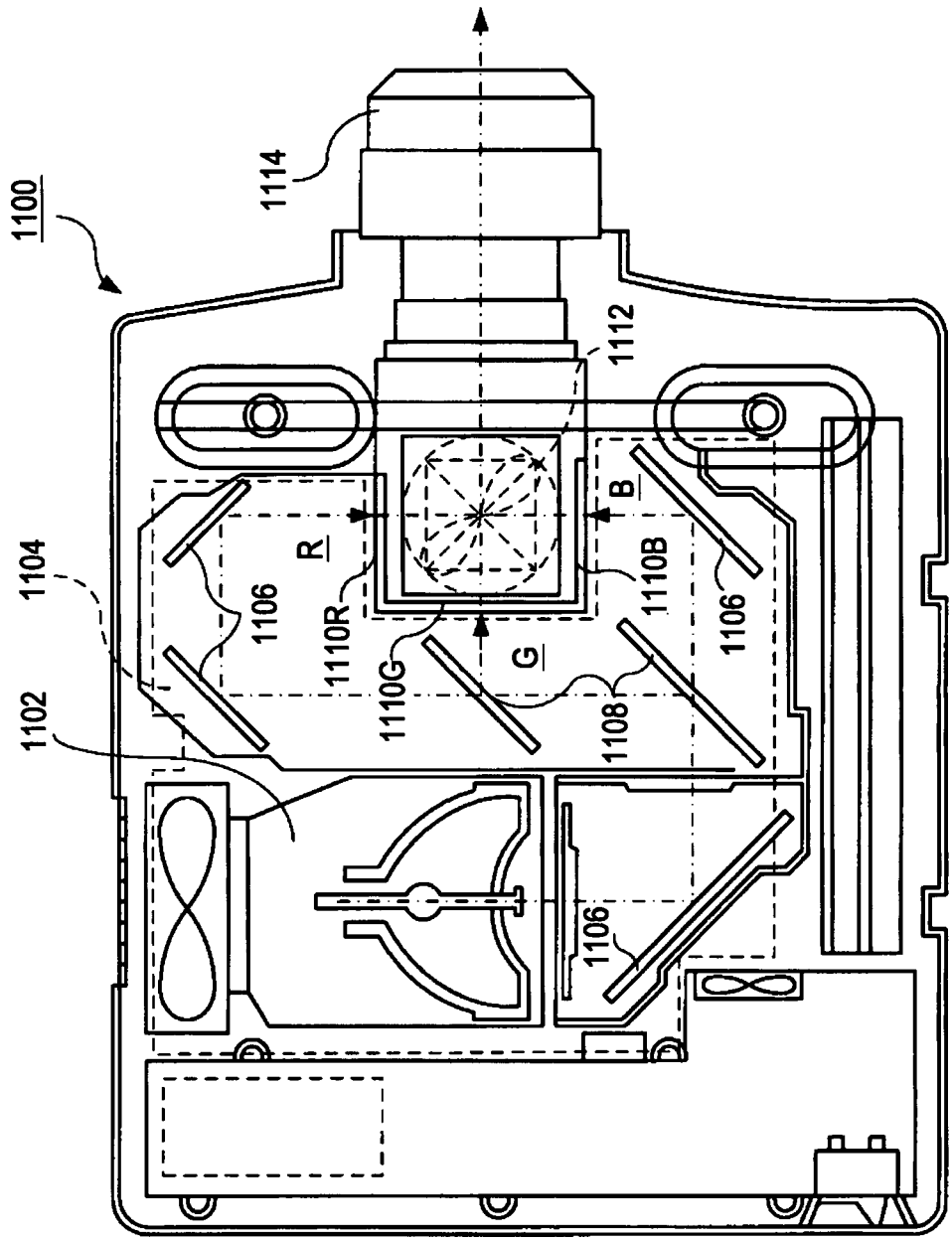
FIG. 6 is a sectional view illustrating a configuration of a liquid crystal projector as an example of an electronic apparatus according to an embodiment of the invention.

A projector, which is an exemplary electronic apparatus according to an embodiment of the invention and to which the above-described liquid crystal device 1 is applied, will now be described. The liquid crystal device 1 is used for a light valve of a projector 1100. FIG. 6 is a plan view showing an exemplary configuration of a projector.

As shown in FIG. 6, a lamp unit 1102 including a white light source, such as a halogen lamp, is provided inside the projector 1100. Projection light emitted from the lamp unit 1102 is separated into three primary colors, i.e., R, G, and B colors, by four mirrors 1106 and two dichroic mirrors 1108, which are disposed in a light guide 1104, and the R, G, and B color light components are incident on liquid crystal panels 1110R, 1110G, and 1110B which serve as light valves corresponding to the R, G, and B colors, respectively.

The configuration of the liquid crystal panels 1110R, 1110G, and 1110B is basically equivalent to the above-described liquid crystal device, and the liquid crystal panels 1110R, 1110G, and 1110B are driven by R, G, and B color signals, respectively, supplied from an image signal processing circuit. The R, G, and B color light components modulated by the liquid crystal panels 1110R, 1110G, and 1110B are incident on a dichroic prism 1112 in the three directions. In the dichroic prism 1112, the R and B color light components are reflected at 90 degrees, while the G color light component passes directly through the dichroic prism 1112. Images containing the respective colors are combined to generate a color image, which can be projected on a screen or the like through a projection lens 1114.

By focusing on display images formed by the liquid crystal panels 1110R, 1110G, and 1110B, it is necessary that the display image formed by the liquid crystal panel 1110G be horizontally inverted (mirror-reversed) with respect to the display images formed by the liquid crystal panels 1110R and 1110B.

By the provision of the dichroic mirrors 1108, light components corresponding to the R, G, and B primary colors are incident on the liquid crystal panels 1110R, 1110G, and 1110B, thereby eliminating the necessity of providing a color filter.

High-quality images can be displayed using such a projector 1100 since display performance deterioration of the liquid crystal panels 1110R, 1110G, and 1110B during manufacturing thereof is reduced. In addition, an overall size of the projector 1100 can be more compact since the liquid crystal panels 1110R, 1110G, and 1110B can be more compact.

The invention may be applied, not only to the above-described type of projectors, but also to reflective-type liquid crystal devices in which elements are formed on a silicon substrate (liquid crystal on silicon (LCOS)), plasma display panels (PDPs), field emission displays (FEDs), surface-conduction electron emitter displays (SEDs), organic electroluminescence (EL) displays, digital micromirror devices (DMDs), electrophoresis apparatuses, etc.

What is claimed is:

1. An electro-optical device comprising:
    a thin-film transistor array substrate;
    a pixel area on the thin-film transistor array substrate, the pixel area including a pixel portion;
    a scanning line and a data line which cross each other in the pixel area;
    a scanning-line driving circuit disposed in a peripheral region around the pixel area, the scanning-line driving circuit supplying a scanning signal to the pixel portion through the scanning line;
    a data-line driving circuit disposed in the peripheral region, the data-line driving circuit supplying a sampling signal;
    a sampling circuit that receives the sampling signal from the data-line driving circuit, samples an image signal in accordance with the sampling signal, and supplies the sampled image signal to the data line, the sampling circuit being disposed in a region between the data-line driving circuit and the pixel area;
    a sealing portion sealing a liquid crystal inlet disposed between the sampling circuit and the pixel area; and
    a plurality of light-shielding films formed on the thin-film transistor array substrate, the plurality of light-shielding films completely overlapping the scanning-line driving circuit and the data-line driving circuit in plan view, and avoiding overlapping other circuits of the peripheral circuit portion disposed in the peripheral region, the plurality of light-shielding films being disposed between the thin-film transistor array substrate and each of the scanning-line driving circuit and the data-line driving circuit,
    wherein the plurality of light-shielding films avoids overlapping the region between the data-line driving circuit and the pixel area such that the plurality of light-shielding films completely avoids overlapping the sampling circuit and the sealing portion.

2. The electro-optical device according to claim 1, wherein the pixel portion has a pixel electrode electrically connected to the data line and a counter electrode facing the pixel electrode, and
    wherein at least one of the light-shielding films is electrically connected to the counter electrode and is formed so as to cover a common electric potential line supplying a common electric potential to the counter electrode.

3. The electro-optical device according to claim 1, wherein the thin-film transistor array substrate includes a plurality of layers, and
    wherein the light-shielding films are formed on the same layer as one of the plurality of layers.

4. The electro-optical device according to claim 1, wherein the light-shielding films are tungsten silicide films.

5. An electronic apparatus comprising an electro-optical device according to claim 1.

* * * * *